US010967703B2

(12) United States Patent
Errick et al.

(10) Patent No.: US 10,967,703 B2
(45) Date of Patent: Apr. 6, 2021

(54) METHOD AND DEVICE FOR VEHICLE CABIN HEATING (71) Applicant: Ford Global Technologies, LLC, Dearborn, MI (US)

(72) Inventors: Steven Errick, Bloomfield Hills, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 15/892,156

(22) Filed: Feb. 8, 2018

(65) Prior Publication Data
US 2019/0241040 A1 Aug. 8, 2019

(51) Int. Cl.
*B60H 1/00* (2006.01)
*B60H 1/22* (2006.01)
*B60H 1/02* (2006.01)
*B60H 1/03* (2006.01)
*F01N 3/02* (2006.01)
*F01N 3/025* (2006.01)
*F01N 9/00* (2006.01)
*F01P 3/20* (2006.01)

(52) U.S. Cl.
CPC ........... *B60H 1/00328* (2013.01); *B60H 1/02* (2013.01); *B60H 1/025* (2013.01); *B60H 1/034* (2013.01); *B60H 1/2218* (2013.01); *F01N 3/0205* (2013.01); *F01N 3/0253* (2013.01); *F01N 9/002* (2013.01); *F01P 3/20* (2013.01); *B60H 2001/2253* (2013.01); *F01N 2900/0422* (2013.01); *F01N 2900/0601* (2013.01); *F01N 2900/08* (2013.01); *F01N 2900/1404* (2013.01); *F01N 2900/1606* (2013.01); *F01P 2025/08* (2013.01); *F01P 2060/08* (2013.01); *Y10S 903/904* (2013.01)

(58) Field of Classification Search
CPC ...... F01N 3/023; F01N 9/002; F01N 2900/14; F01N 2900/1606; F01N 5/02; F02D 41/029; F02D 2200/0812
See application file for complete search history.

(56) References Cited

U.S. PATENT DOCUMENTS

| 7,793,856 B2 | 9/2010 | Hernandez et al. |
| 8,302,876 B2 | 11/2012 | Sanger et al. |
| 9,144,761 B2 * | 9/2015 | Quix ............... F02D 41/0245 |
| 2001/0013409 A1 * | 8/2001 | Burk ..................... B60H 1/025 |
| | | 165/240 |
| 2003/0094269 A1 * | 5/2003 | Arai ....................... F24F 3/147 |
| | | 165/166 |
| 2004/0226287 A1 * | 11/2004 | Edgar ..................... F01N 3/023 |
| | | 60/295 |

(Continued)

*Primary Examiner* — Redhwan K Mawari
(74) *Attorney, Agent, or Firm* — Geoffrey Brumbaugh; McCoy Russell LLP (57) ABSTRACT Methods and systems are provided for adjusting a vehicle cabin heating system, based on particulate filter (PF) regeneration prediction. In one example, a method includes predicting an amount of exhaust heat that may be recovered via an exhaust heat exchanger during an upcoming PF regeneration event, and prior to the PF regeneration event, adjusting an amount of electric power supplied to an electric heater of the cabin heating system. The amount of adjustment may be based on the predicted amount of exhaust heat that may be recovered.

9 Claims, 4 Drawing Sheets

(56) References Cited

U.S. PATENT DOCUMENTS

| | | | |
|---|---|---|---|
| 2008/0066621 A1* | 3/2008 | Naito | F01N 3/0226 96/55 |
| 2009/0183499 A1* | 7/2009 | Boorse | F01N 9/002 60/295 |
| 2012/0297765 A1* | 11/2012 | Vigild | F01P 3/20 60/599 |
| 2018/0094556 A1* | 4/2018 | Kurtz | F02D 41/1446 |
| 2019/0241040 A1* | 8/2019 | Errick | B60H 1/02 |

* cited by examiner

METHOD AND DEVICE FOR VEHICLE CABIN HEATING

FIELD

The present description relates generally to methods and systems for adjusting a heating, ventilation, and air conditioning (HVAC) system, based on particulate filter regeneration prediction.

BACKGROUND/SUMMARY

Residual heat generated during combustion may be effectively used for providing heat to a vehicle cabin. Engine coolant circulating through the engine and through an exhaust heat exchanger may extract thermal energy from the engine and exhaust gas which may be transferred to a heater core of an on-board heating, ventilation, and air conditioning (HVAC) system. The extracted energy may be utilized for providing heat to the engine and also to warm the vehicle cabin, thereby improving engine, and fuel efficiency. However, as the operating efficiency of the engine increases, residual heat extracted by the coolant may be insufficient for cabin heating.

Certain HVAC systems may be configured with an electric heater to provide supplemental heating during conditions when the heat extracted by the coolant system may be insufficient to meet cabin heating demands. However, operation of the electric heater via an on-board battery causes parasitic loss of engine power.

In a different approach, in U.S. Patent Application No. 2013-778,683, Quix et al. discloses a method for providing supplemental heat for vehicle cabin heating purposes during regeneration of an exhaust particulate filter (PF). During the regeneration, the engine is operated at reduced efficiency to generate exhaust heat which may be used to burn the soot accumulated on the PF. A portion of the heat generated during the PF regeneration may be transferred to the vehicle heater core to be used for providing cabin heat.

The inventors herein have identified systems and methods by which issues with the above approaches are resolved. One example method comprises, predicting an amount of exhaust heat recovered from an upcoming regeneration of a particulate filter (PF) coupled to an exhaust passage of an engine propelling a vehicle, and adjusting an amount of electrical power supplied to an electric heater coupled to a cabin heating system for a cabin of the vehicle, the amount of adjustment based on the predicted amount of recovered exhaust heat. In this way, by predicting an upcoming PF regeneration event, operation of the electric heater may be adjusted prior to the regeneration event, such that the supplemental heat may be effectively utilized for vehicle cabin heating. By replacing a portion or all of the heat provided by the electric heater with exhaust heat, parasitic losses are reduced. Further, by predicting regeneration of the P'F, and beginning the reduction in electric heat early, delays in reducing the electric heat are mitigated further reducing parasitic losses.

In another example, a particulate filter may be coupled to the engine exhaust passage to capture particulate matter (soot) present in the exhaust gas. Once soot accumulation has reached a predetermined level, regeneration of the filter may be initiated by increasing the temperature of exhaust gas flowing through the PF. An engine system may be configured with an exhaust heat exchanger for recovering exhaust heat. Thermal energy from the exhaust gas may be recovered by coolant flowing through the heat exchanger and the recovered thermal energy may then be utilized for providing heat to the vehicle cabin. For higher efficiency engines which have lower thermal output, based on cabin heating demands, an electric heater, powered via a battery, may be coupled to the heater core to supply heat to the vehicle cabin. The controller may predict an upcoming PF regeneration event based on a soot load on the PF and a rate of accumulation of soot on the PF. An amount of exhaust heat available to the exhaust heat exchanger during the upcoming PF regeneration event may be predicted as a function of temperature of exhaust gas flowing through the heat exchanger, a volume of exhaust gas flowing through the heat exchanger, and a temperature of coolant flowing through the heat exchanger, during the upcoming regeneration. In anticipation of availability of exhaust heat during the PF regeneration event, prior to the commencement of the PF regeneration, the power supplied to the electric heater may be reduced. Also, prior to initiation of the PF regeneration event, a speed of a blower of the HVAC system and a position of a blend door of the HVAC system may be adjusted based on each of the predicted amount of exhaust heat recovered during the upcoming regeneration and cabin heating demand.

In this way, by preemptively adjusting a power supplied to the electric heater even before the PF regeneration is initiated, delays in response of the electric heater during the ramp down phase may be reduced. By ramping down the electric heater prior to the availability of the excess exhaust heat, the thermal energy from the exhaust gas may be completely utilized and parasitic loss of engine power may be reduced. The technical effect of predicting PF regeneration is that HVAC system components including blend door and blower may be adjusted based on an anticipated availability of exhaust heat during the PF regeneration event. In this way, by opportunistically utilizing residual exhaust heat during PF regeneration events, vehicle cabin heating may be improved while reducing power usage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
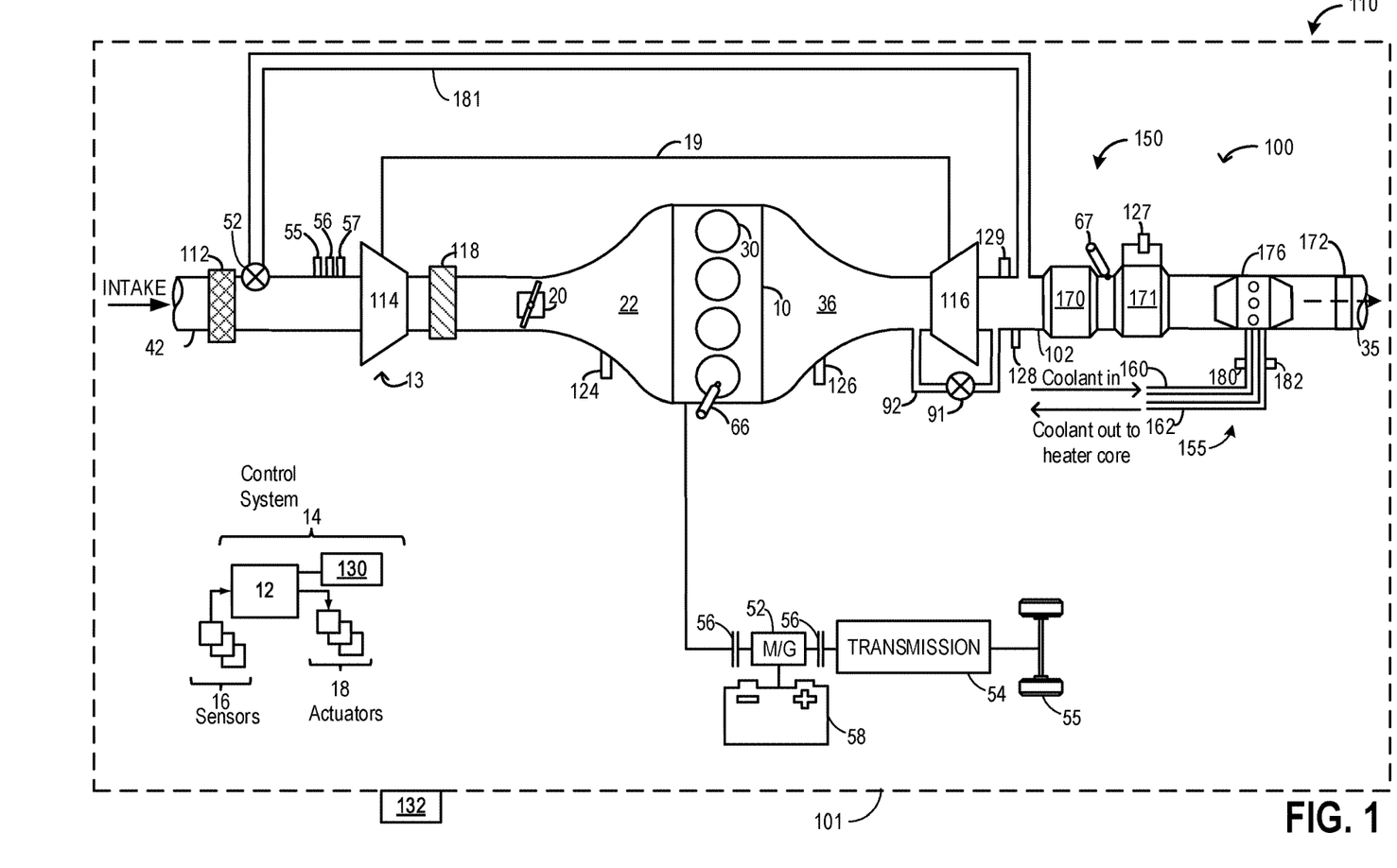
FIG. 1 shows an example embodiment of an engine system including an exhaust gas heat exchanger.
Figure 2:
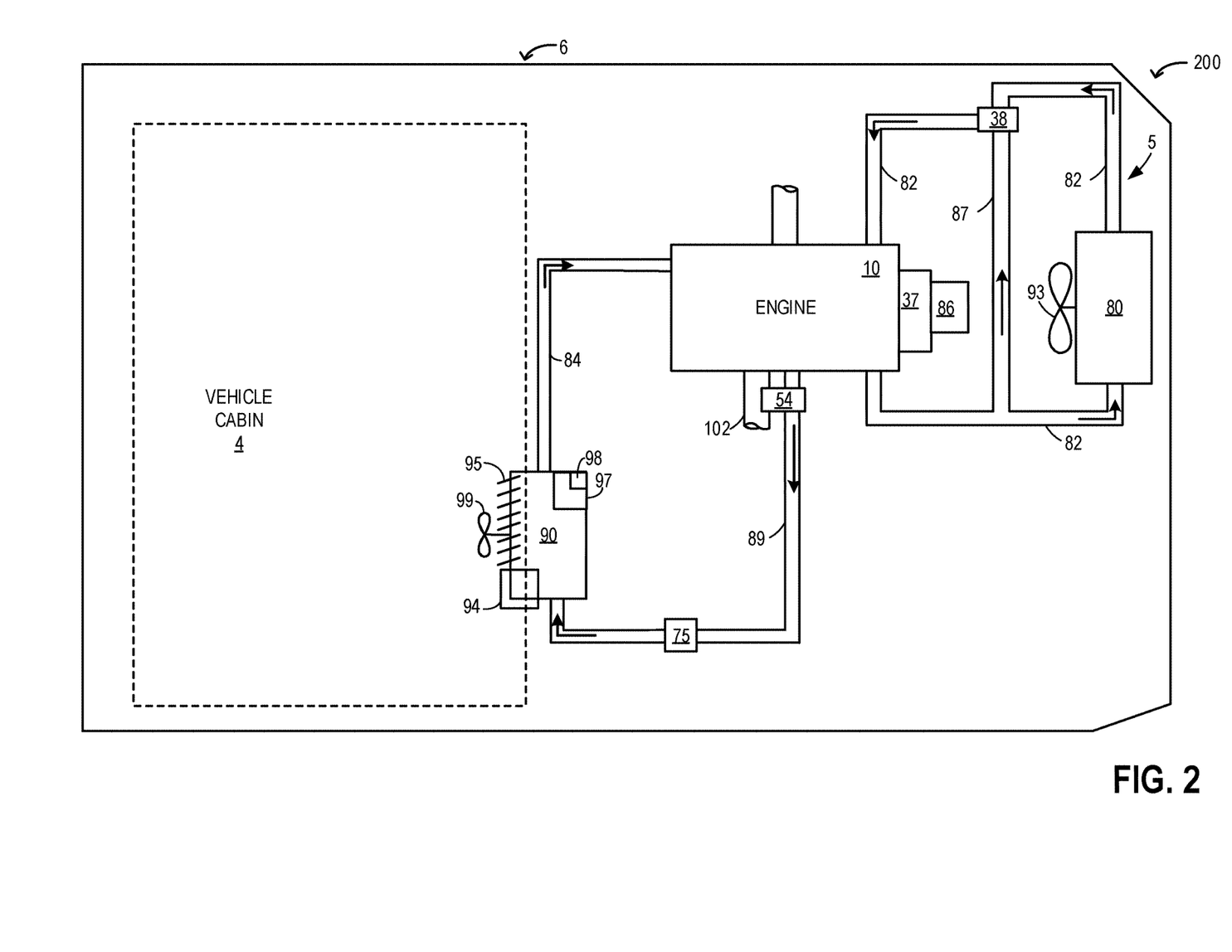
FIG. 2 shows an example vehicle heating, ventilation and air-conditioning (HVAC) system fluidically coupled to the exhaust gas heat exchanger in FIG. 1.

The following description relates to systems and methods for adjusting one or more components of an on-board vehicle heating, ventilation and air-conditioning (HVAC) system based on a predicted particulate filter (PF) regeneration event. An example engine system including an exhaust heat exchanger and a particulate filter is shown in FIG. 1. The exhaust heat exchanger is coupled to the HVAC system, as shown in FIG. 2. An engine controller may be configured to perform control routines, such as the example routine of FIG. 3, to utilize exhaust heat available during a PF regeneration event and adjust HVAC system components prior to initiation of the PF regeneration event. An example adjustment to the HVAC system upon prediction of an upcoming PF regeneration event is shown in FIG. 4.

FIG. 1 shows a schematic view 110 of a vehicle system 101 with an example engine system 100 including an engine 10. In one example, the engine system 100 may be a diesel engine system. In one example, the engine system 100 may be a gasoline engine system. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 91 may be actuated open to dump at least some exhaust pressure from upstream of the turbine to a location downstream of the turbine via wastegate passage 92. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control devices 170 and 171. In one example, the first emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

The second emission control device 171 may be a regeneratable particulate filter (PF) configured to trap and oxidize soot particles in the exhaust flow. The PF may be manufactured from a variety of materials including cordierite, silicon carbide, and other high temperature oxide ceramics. Once soot accumulation has reached a predetermined level (identified via pressure drop, for example), regeneration of the filter may be initiated. Filter regeneration may be accomplished by heating the filter to a temperature that will burn soot particles at a faster rate than the rate of deposition of new soot particles, for example, 400-600° C. In one example, the PF may be a catalyzed particulate filter containing a washcoat of precious metal, such as platinum, to lower soot combustion temperature and also to oxidize hydrocarbons and carbon monoxide to carbon dioxide and water. In one example, the PF may be a diesel particulate filter (DPF). An upcoming regeneration of the PF may be scheduled based on one or more of an estimated soot load on the PF, a time elapsed since an immediately previous regeneration of the PF, and a rate of soot production during combustion. Scheduling the PF regeneration includes determining a time of the regeneration event and immediately prior to the time of the regeneration event, actively increasing a temperature of exhaust gas flowing through the PF.

A hydrocarbon (HC) reductant delivery system 67 may be used to deliver HC from the fuel tank or from a storage vessel to the exhaust system to generate heat for actively increasing a temperature of exhaust gas flowing through the PF 171 for regeneration purposes. Alternatively, or in addition, fuel may be injected to one or more engine cylinders during an exhaust stroke to increase temperature of exhaust gas flowing through the PF.

A plurality of sensors, including an exhaust temperature sensor 128, an exhaust oxygen sensor, an exhaust flow sensor, and exhaust pressure sensor 127 may be coupled to the main exhaust passage 102. The oxygen sensor may be linear oxygen sensors or UEGO (universal or wide-range exhaust gas oxygen), two-state oxygen sensors or EGO, HEGO (heated EGO), a NOx, HC, or CO sensors. The pressure sensor 127 may be a differential pressure sensor coupled across the PF 171. The differential pressure sensor 127 may be used to estimate exhaust backpressure and airflow across the PF 171. A soot load deposited on the PF may be estimated based on the exhaust backpressure and airflow through the PF, as estimated via the differential pressure sensor 127.

Exhaust gas recirculation (EGR) delivery passage 181 may be coupled to the exhaust passage 102 downstream of turbine 116 to provide low pressure EGR (LP-EGR) to the engine intake manifold, upstream of compressor 114. An EGR valve 52 may be coupled to the EGR passage 181 at the junction of the EGR passage 181 and the intake passage 42. EGR valve 52 may be opened to admit a controlled amount of exhaust to the compressor inlet for desirable combustion and emissions control performance. EGR valve 52 may be configured as a continuously variable valve or as an on/off valve. In further embodiments, the engine system may include a high pressure EGR flow path wherein exhaust gas is drawn from upstream of turbine 116 and recirculated to the engine intake manifold, downstream of compressor 114. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 181 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

From downstream of the PF 171, exhaust may flow to the atmosphere via the muffler 172 and tailpipe 35. A heat exchanger 176 may be coupled to exhaust passage 102 downstream of the PF 171 and upstream of the muffler 172 to extract heat from the exhaust passing through the exhaust passage 102. In one example, the heat exchanger 176 is a water-gas exchanger. The heat exchanger 176 may recover exhaust heat for use in engine heating and vehicle cabin heating.

Coolant lines of a vehicle on-board heating, ventilation, and air conditioning (HVAC) system 155 may be fluidically coupled to the exhaust heat exchanger 176 for exhaust heat recovery. Coolant of the HVAC system may flow from the engine to the heat exchanger via a coolant inlet line 160 and after circulating through the heat exchanger, the coolant may flow to a heater core via a coolant outlet line 162. A first coolant temperature sensor 180 may be coupled to the coolant inlet line 160, upstream of the heat exchanger 176, to measure the temperature of coolant entering the heat exchanger. A second coolant temperature sensor 182 may be coupled to the coolant outlet line 162, downstream of the heat exchanger 176, to measure the temperature of coolant exiting the heat exchanger. An amount of heat recovered from the exhaust gas may be estimated based on a difference between temperature of coolant entering the heat exchanger 176, as estimated via the first temperature sensor 180, and temperature of coolant exiting the heat exchanger 176, as estimated via the second temperature sensor 182. A detailed description of the HVAC system is discussed in FIG. 2.

A human machine interface (HMI) 130 such as a touch screen may be coupled to the vehicle cabin. A vehicle operator may indicate a desired temperature in the vehicle cabin via the HMI 130. The HMI may be coupled to an on-board climate control system. In one example, the HMI 130 may include a hard switch which may be actuated by the operator to initiate cabin heating. In another example, the HMI 130 may include a menu option that enables temperature adjustments for the vehicle cabin. In yet another example, a switch may be included in a key fob and may be activated from within or outside the vehicle 101 to initiate cabin heating. In a further example, cabin heating may be requested via an application in a smart phone. A temperature sensor 132 may be coupled to the vehicle cabin to estimate temperature of the cabin.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include first coolant temperature sensor 180 coupled to the coolant inlet line 160, second coolant temperature sensor 182 coupled to the coolant outlet line 162, exhaust gas sensor 126 located upstream of the turbine 116, MAP sensor 124, exhaust temperature sensor 128, differential pressure sensor 129, cabin temperature sensor 132, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 18 may include, for example, throttle 20, EGR valve 52, wastegate actuator 91, and fuel injector 66, and HC injector 67. The control system 14 may include a controller 12. The controller 12 may receive input data from the various sensors, process the input data, and trigger various actuators in response to the processed input data based on instruction or code programmed therein corresponding to one or more routines. For example, based on input from the differential pressure sensor 127, the controller may estimate soot load on the PF 171 and in response to the soot load increasing to above a threshold soot load, the controller may predict an upcoming PF regeneration event and may send a signal to the injector 67 to inject fuel upstream of the PF 171 prior to the predicted PF regeneration event in order to increase exhaust temperature.

FIG. 2 shows an example embodiment 200 of an on-board heating, ventilation, and air conditioning (HVAC) system 5 (also referred herein as the coolant system) in a motor vehicle 6. Coolant system 5 circulates engine coolant and distributes recovered heat from an exhaust heat exchanger 54 through internal combustion engine 10 and the heater core 90. In one example, the coolant system 5 may be the HVAC system 155 and the exhaust heat exchanger 54 may be the heat exchanger 176 in FIG. 1.

FIG. 2 shows coolant system 5 coupled to engine 10 and circulating engine coolant from engine 10, through exhaust heat exchanger 54 via the heater core 90, and to radiator 80 and/or radiator bypass line 87 via engine-driven (or electrical) water pump 86, and back to engine 10. Coolant from the engine may flow to the heater core 90 via coolant line 89 and heat from the coolant may be transferred to the heater core 90. The heat exchanger 54 may be positioned in the coolant line 89 between the engine 10 and the heater core 90. In one example, as engine coolant is circulated through the heat exchanger 54, heat from exhaust may be transferred to the engine coolant, and then the heated coolant (heated with the extracted exhaust heat and heat extracted from engine 10) may be routed through the heater core 90. An auxiliary pump 75 may be coupled to the coolant line 89 to enable coolant flow via the heater core 90 and the heat exchanger 54. In one example, an evaporator may be coupled to the coolant line 89 upstream of the heater core. From the heater core, the coolant may be circulated back to the engine via the coolant line 84.

Water pump 86 may be coupled to the engine via front end accessory drive (FEAD) 37, and rotated proportionally to engine speed via belt, chain, etc. Specifically, water pump 86 circulates coolant through passages in the engine block, head, etc., to absorb engine heat, which is then transferred via the radiator 80 to ambient air as regulated by thermostat valve 38. In an example where pump 86 is a centrifugal pump, the pressure (and resulting flow) produced may be proportional to the crankshaft speed, which may be directly proportional to engine speed. The temperature of the coolant may be regulated by a thermostat valve 38, which may be kept closed until the coolant reaches a threshold temperature, thereby reducing the transfer of heat from radiator 80 to ambient air when closed.

After flowing through the engine 10, coolant may exit the engine via coolant line 82 and may flow through the radiator 80 or through radiator bypass line 87 as regulated via the thermostat valve 38 with flow being directed through radiator bypass line 87 during conditions when the engine temperature (coolant temperature) is below a threshold temperature.

A fan 93 may be coupled to radiator 80 in order to increase airflow through radiator 80 as needed to maintain coolant temperatures below a desired threshold. In some examples, fan speed may be controlled by the engine controller directly. Alternatively, fan 93 may be coupled to the engine and driven directly from it.

In one example, a climate control system 94 may be coupled to the vehicle cabin 4. The climate control system 94 may be a part of the heater core 90 and heat from the heater core may be used for cabin heating via the climate control system 94. The operator may specify a desired cabin temperature via input to a human machine interface (such as HMI 130 in FIG. 1) coupled to the climate control system 94. The climate control system 94 may have vanes and/or blend door 95 to allow air to circulate between the heater core 90 and the vehicle cabin 4. Based on the temperature settings and fan settings as specified by the operator, one or more of a speed of the fan (blower) 99 and a position of the vanes and/or door 95 may be adjusted. As an example, in response to an increase in cabin 4 heating demand, the controller may increase each of the speed of the fan and the opening of the vanes (such as a blend door at the inlet of the heater core) of the climate control system 94 to allow a higher amount of warm air to flow from the heater core 90 to the cabin 4. Similarly, in response to a decrease in cabin 4 heating demand, the controller may decrease the opening of the vanes of the climate control system 94 to reduce flow of warm air from the heater core 90 to the cabin 4.

In certain engines, such as diesel engines, due to the high efficiency of engine operation, the thermal output of the engine may be lower. Therefore, the heat transferred from the engine to the coolant and the heat extracted from exhaust may not be sufficient for providing cabin heat. An electric heater 97 may be coupled to the heater core to provide additional heat based on cabin heating demands. The electric heater may be operated via a battery 98. The battery may be recharged using engine power. The cabin heating demand may be based on each of a desired cabin temperature as indicated by an operator of the vehicle via a human machine interface (HMI) coupled to the cabin and an actual cabin temperature as estimated via a temperature sensor coupled to the cabin, the cabin heating demand increasing with an increase in a difference between the desired cabin temperature and the actual cabin temperature.

In order to reduce the parasitic use of engine power, during conditions when a higher amount of exhaust heat may be available, the controller may opportunistically reduce the power delivered to the electric heater 97 from the battery 98. In one example, an upcoming regeneration of the PF may be scheduled and a corresponding amount of exhaust heat flow during the upcoming PF regeneration event may be predicted. Predicting the amount of exhaust heat flow includes predicting a volume of exhaust flowing through the heat exchanger 54 during the scheduled regeneration event and predicting a temperature of exhaust flowing through the heat exchanger during the scheduled regeneration event, the predicted amount of exhaust heat flow increasing with each of an increase in the predicted volume of exhaust flowing through the heat exchanger and the predicted temperature of exhaust flowing through the heat exchanger. Prior to the initiation of the scheduled regeneration event, an amount of power supplied to an electric heater 97 may be reduced based on the predicted amount of exhaust heat flow. The amount of power supplied to the electric heater 97 may be inversely proportional to the predicted amount of exhaust heat flow, the amount of power supplied decreased with an increase in the predicted amount of exhaust heat flow. The amount of adjustment of electrical power supplied to the electric heater may be further based on the cabin heating demand, the amount of adjustment increased with an increase in the predicted amount of recovered exhaust heat and the amount of adjustment decreased with an increase in the cabin heating demand.

A speed of the blower 99 may be adjusted based on each of the predicted amount of exhaust heat recovered during the upcoming regeneration and the cabin heating demand, the speed of the blower decreased with one or more of an increase in the predicted amount of exhaust heat recovered and a decrease in the cabin heating demand. Also, a position of the blend door 95 may be adjusted based on each of the predicted amount of exhaust heat recovered during the upcoming regeneration and the cabin heating demand, the opening of the blend door decreased with one or more of an increase in the predicted amount of exhaust heat recovered and a decrease in the cabin heating demand.

In this way, the systems of FIGS. 1 and 2 enable a system for a vehicle comprising: a vehicle, including an autonomous vehicle and/or a hybrid vehicle, an engine including one or more cylinders, one or more fuel injectors coupled to the one or more cylinders, a vehicle cabin including a human machine interface (HMI) and a temperature sensor, an engine intake manifold, an engine exhaust system including an exhaust passage, the exhaust passage including a particulate filter (PF) and an exhaust heat exchanger positioned downstream of the particulate filter, a differential pressure sensor coupled to the exhaust passage across the PF, a coolant system with an incoming coolant line and an outgoing coolant line for circulating coolant through the heat exchanger, the coolant system further coupled to each of an engine block, and a heater core of a heating, ventilation and air conditioning (HVAC) system, the HVAC system including an electric heater operated via a battery, a blend door, and a blower, and a controller with computer readable instructions stored on non-transitory memory to: estimate a load on the PF via the differential pressure sensor, estimate a heating demand of the vehicle cabin based on a temperature setting indicated via the HMI and a cabin temperature estimated via the temperature sensor, in response to a higher than threshold load of the PF, predict a regeneration of the PF, and adjust operation of one or more of the electric heater, the blend door, and the blower based on each of an anticipated amount of heat recovered by the coolant circulating through the heat exchanger during the predicted regeneration of the PF and the heating demand of the vehicle cabin.

Figure 3:
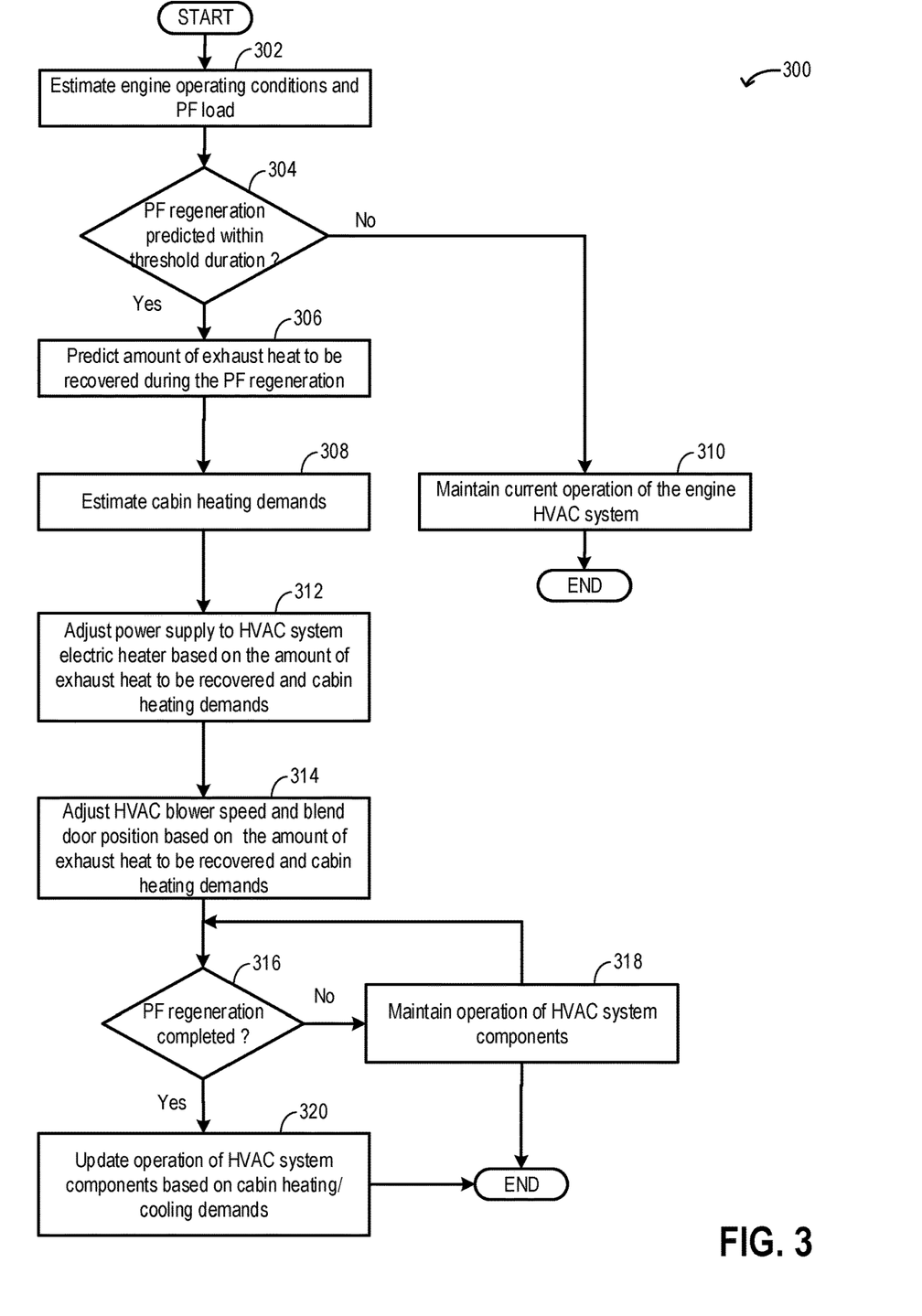
FIG. 3 shows a flow chart illustrating an example method that may be implemented for adjusting the HVAC system based on particulate filter regeneration prediction.
Figure 4:
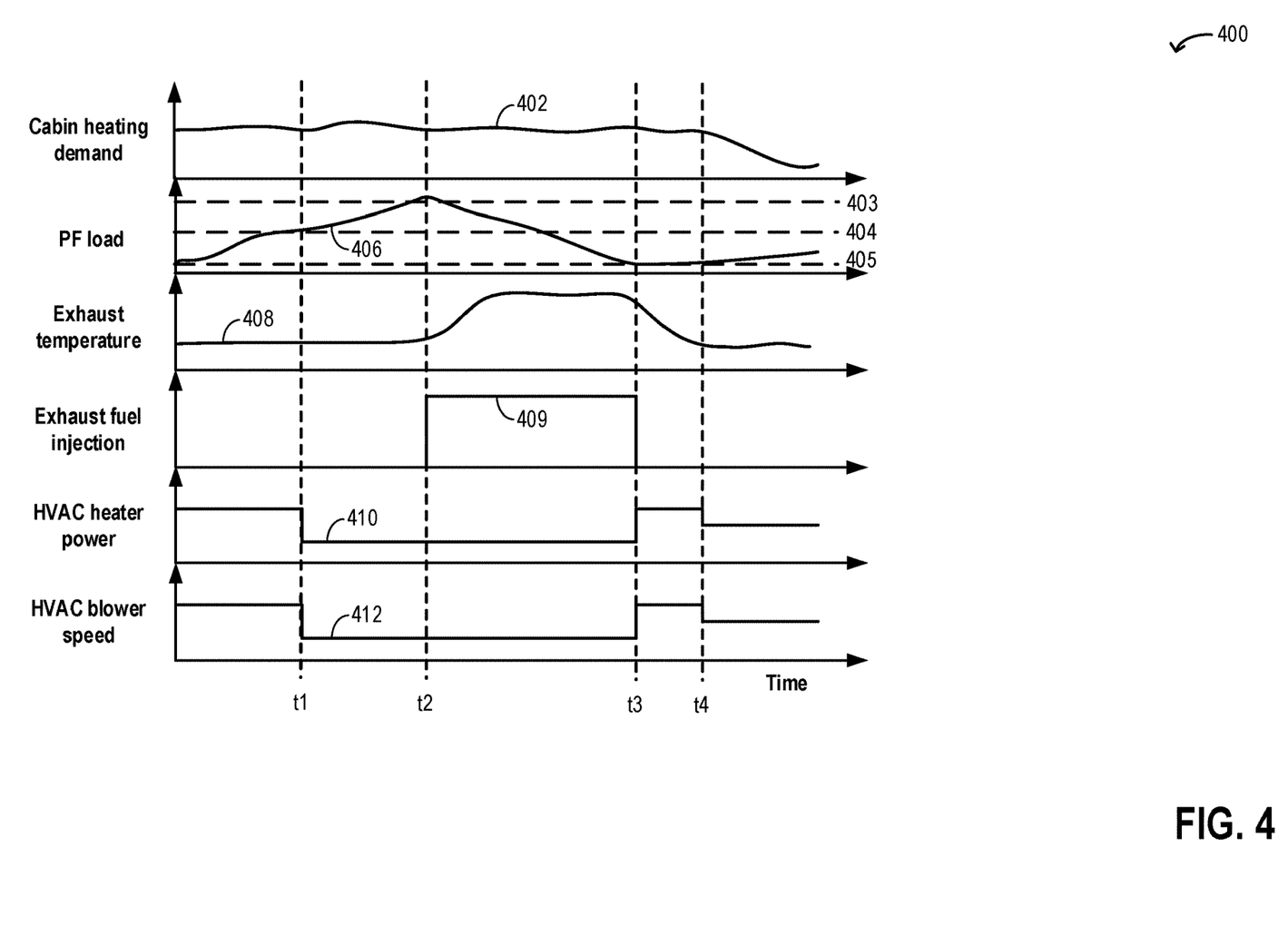
FIG. 4 shows an example adjustment to HVAC system based on an anticipated particulate filter regeneration, according to the present disclosure.

FIG. 3 shows an example method 300 for adjusting a heating, ventilation, and air conditioning (HVAC) system (such as HVAC system 155 in FIG. 1) based on prediction of regeneration of an exhaust particulate filter (such as particulate filter 171 in FIG. 1). Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, exhaust pressure, manifold pressure, manifold air flow, battery state of charge, etc. The controller may determine PF soot loading based on exhaust pressure as estimated via an differential pressure sensor (such as pressure sensor 127 in FIG. 1) coupled across the PF. The controller may determine the PF loading based on a calculation using a look-up table with the input being exhaust pressure and the output being PF loading. The controller may also determine a rate of soot generation by the engine as a function of engine operating conditions including one or more of engine load, engine speed, and engine temperature. The rate of soot generation may be further based on the type of fuel used (such as diesel).

At 304, the routine includes determining if PF regeneration is predicted to take place within a threshold duration. The threshold duration may correspond to a time desired for a heating, ventilation, and air conditioning (HVAC) system component such as an electric heater to ramp down. As an example, the threshold duration may be 2 minutes, and the controller may determine if the immediately upcoming PF regeneration event may take place within the next 2 minutes. PF regeneration may be carried out when the soot load on the PF reaches an upper threshold soot load. The upper threshold soot load may be calibrated based on exhaust back pressure and the upper threshold soot load may correspond to a soot load level above which exhaust expulsion from cylinders may be adversely affected, negatively influencing engine performance. The time to reach the upper threshold soot level may be predicted based on the PF loading and a rate of soot generation. In one example, controller may determine the time remaining for the immediately upcoming PF regeneration event based on a calculation using a look-up table with the input being PF loading and a rate of soot generation and the output being the time remaining for the immediately upcoming PF regeneration event. Also, prediction of the upcoming PF regeneration may be based on a time elapsed since an immediately previous regeneration of the PF. Active regeneration of the PF may be carried out periodically after a predetermined amount of time has elapsed since the immediately previous PF regeneration event. Further, prediction of the upcoming PF regeneration may be based on a distance travelled since an immediately previous regeneration of the PF. Active regeneration of the PF may be carried out periodically after a predetermined distance has been travelled since the immediately previous PF regeneration event. In one example, PF regeneration may be carried out if 10 days has elapsed since the immediately previous regeneration event and/or the vehicle has travelled 200 miles since the immediately previous regeneration event.

If it is determined that a PF regeneration event is not predicted to occur within the threshold duration, at 310, current operation of the HVAC system may be maintained. Operation of the HVAC system may include operation of an electric heater (such as electric heater 97 in FIG. 2) to supply heat to the heater core (such as heater core 90 in FIG. 2), via a battery (such as battery 98 in FIG. 2), for use in vehicle cabin heating. The power supplied to the electric heater may be directly proportional to the cabin heating demands. Cabin heating/cooling demands may be determined as a function of current vehicle cabin temperature and a desired vehicle cabin temperature. Current vehicle temperature may be estimated via a temperature sensor (such as sensor 132 in FIG. 1) coupled to the vehicle cabin. The desired cabin temperature may be indicated by the vehicle operator as an input via a human machine interface (HMI) coupled to the vehicle dashboard. The operator may also indicate the desired temperature setting via an application in a smartphone and/or a remote switch in a key fob. If the desired cabin temperature is lower than the current vehicle cabin temperature, cabin heating may be desired, and a corresponding cabin heating demand may be estimated. In one example, if there is an increase in the difference between the desired vehicle cabin temperature and the current vehicle cabin temperature, the cabin heating demand may increase. If the desired cabin temperature is higher than the current vehicle cabin temperature, cabin cooling may be desired, and a corresponding cabin cooling demand may be estimated.

Also, an opening of a blend door and/or vanes (such as door/vanes 95 in FIG. 2) coupled to the heater core may be adjusted based on the cabin heating demand. In one example, the opening of the blend door/vanes may be increased to supply a higher amount of heat from the heater core to the vehicle cabin in response to an increase in cabin heating demand. In another example, the opening of the blend door/vanes may be decreased to lower heat supply from the heater core to the vehicle cabin in response to a decrease in cabin heating demand. Further, a speed of operation of a blower (such as fan 99 in FIG. 2) coupled to the heater core may be adjusted based on the cabin heating demand. In one example, the speed of operation of the blower may be increased to supply a higher amount heated air from the heater core to the vehicle cabin in response to an increase in cabin heating demand. In another example, the speed of operation of the blower may be decreased to lower the heated air flow from the heater core to the vehicle cabin in response to a decrease in cabin heating demand.

If at 304 it is determined that PF regeneration may be predicted to take place within the threshold duration, at 306, the controller may predict an amount of heat that may be recovered from exhaust gas during the upcoming PF regeneration event. During passive PF regeneration, engine operation may not be altered for additional exhaust heat generation and available exhaust heat may be opportunistically used to burn the soot accumulated on the PF. If the soot load on the PF increases to above the upper threshold soot load, active regeneration of the PF may be carried out. In order to actively regenerate the PF, temperature of the exhaust gas flowing through the PF may be increased. One or more engine operating parameters may be adjusted to increase the thermal output of the engine. In one example, fuel may be injected to one or more engine cylinders during an exhaust stroke. In another example, fuel may be injected to the exhaust passage via a fuel injector (such as injector 67 in FIG. 1), coupled to the exhaust passage upstream of the PF. Late injection of fuel or additional fuel injection to the exhaust passage causes an exothermic reaction to take place in the engine exhaust system, thereby causing heat generation in the exhaust passage. In this way, the temperature of exhaust gas flowing through the PF may be increased such that the soot deposited on the PF may be burnt. As the PF is regenerated, additional heat may be generated causing the temperature of exhaust flowing downstream from the PF to further increase. The thermal energy from the exhaust may be recovered via an exhaust heat exchanger (such as heat exchanger 176 in FIG. 1) coupled to the exhaust passage downstream of the PF. Coolant circulating through the exhaust heat exchanger may collect the thermal energy from the exhaust flowing therethrough and transfer the thermal energy to the heater core.

The controller may predict the amount of exhaust heat that may be recovered during the upcoming PF regeneration event based on one or more of a temperature of exhaust gas flowing through the heat exchanger, a volume of exhaust gas flowing through the heat exchanger, and a temperature of coolant flowing through the heat exchanger, during the PF regeneration. In one example, the amount of exhaust heat that may be recovered may increase with an increase in each of the temperature of exhaust gas flowing through the heat exchanger and the volume of exhaust gas flowing through the heat exchanger, and the amount of exhaust heat that may be recovered may decrease with a decrease in the temperature of coolant flowing through the heat exchanger. As an example, the controller may use a look-up take to predict an amount of exhaust heat that may be recovered with the temperature of exhaust gas flowing through the heat exchanger, with the volume of exhaust gas flowing through the heat exchanger, and the temperature of coolant flowing through the heat exchanger as input and the amount of exhaust heat that may be recovered as output of the table. The controller may predict the temperature of exhaust gas flowing through the heat exchanger and the volume of exhaust gas flowing through the heat exchanger during the PF regeneration based on the engine operating conditions such as fuel schedule (including late injection and additional fuel injection to the exhaust passage upstream of the PF). In one example, the temperature of exhaust gas flowing through the heat exchanger and the volume of exhaust gas flowing through the heat exchanger during the PF regeneration may be a function of an amount of fuel delivered to the engine cylinders and the exhaust passage, and timing of fuel injection. The temperature of coolant flowing through the heat exchanger may be estimated via a coolant temperature sensor (such as coolant temperature sensor 180 in FIG. 1) coupled to the coolant line entering the heat exchanger.

At 308, current cabin heating/cooling demands may be estimated. As previously described, cabin heating/cooling demands may be determined as a function of current vehicle cabin temperature and a desired vehicle cabin temperature. At 312, in anticipation of available exhaust heat, power supplied to the heating device (electric heater) of the HVAC system may be adjusted. During the upcoming PF regeneration event, additional exhaust heat may be available to the heater core to be used for providing cabin heating. If based on a current cabin heating demand, the electric heater is operated, upon the prediction that additional heat may be available within a threshold duration, the power supplied to the electric heater may be reduced to ramp down the electric heater. The reduced amount of power supplied to the heating device from the battery may be based on each of the predicted amount of exhaust heat recovered during the upcoming regeneration and a cabin heating demand. The controller may determine the reduced amount of power supplied to the heating device using a look-up table with each of the predicted amount of exhaust heat recovered and the cabin heating demand as inputs and the amount of power to be supplied to the heating device as the output. In one example, if the anticipated available heat is sufficient to meet the cabin heating demands, the controller may send a signal to the actuator coupled to the electric heater to shut down the electric heater. By initiating the ramp down process for the electric heater prior to the actual PF regeneration event (when the excess heat will be available), delays in response of the electric heater may be reduced. By reducing the power supplied to the electric heater prior to the availability of the excess exhaust heat (during the upcoming PF regeneration), the excess thermal energy from the exhaust gas may be completely utilized and parasitic loss of engine power may be reduced.

If instead of a cabin heating demand, there is a demand for cabin cooling, and the electric heater is in a switched-off condition, the heater may be maintained in the deactivated state and the thermal energy recovered during the PF regeneration may be stored in the battery coupled to the electric heater for future use.

In addition to adjusting operation of the electric heater, at 314, a speed of the blower and the position of the blend door/vanes may be adjusted based on each of the predicted amount of exhaust heat to be recovered and cabin heating demand. In one example, the speed of the blower may be decreased with one or more of an increase in the predicted amount of exhaust heat recovered and a decrease in the cabin heating demand. The controller may determine the reduced blower speed using a look-up table with each of the predicted amount of exhaust heat recovered and the cabin heating demand. By reducing the blower speed, the energy used for operating the blower may be reduced, thereby reducing parasitic use of engine power. In another example, based on each of the predicted amount of exhaust heat to be recovered and cabin heating demand, the controller may suspend operation of the electric heater and increase the speed of the blower. By deactivating the electric heater, the reduction in energy usage may be higher than the energy required for operating the blower at the higher speed. The opening of the blend door/vanes may be decreased with one or more of an increase in the predicted amount of exhaust heat recovered and a decrease in the cabin heating demand. By decreasing the opening of the blend door, transfer of heat from the heater core to the passenger cabin may be reduced during the PF regeneration event when there may be a spike in the heater core thermal energy content. By controlling heat transfer to the vehicle cabin, overheating of the cabin during the PF regeneration event may be avoided. Also, if the cabin heating demand decreases, there may be a corresponding decrease in the blend door opening to reduce heat transfer from the heater core to the vehicle cabin, such that the actual cabin temperature reduces to the desired cabin temperature.

At 316, the routine includes determining if the PF regeneration is completed. PF regeneration may be completed when the soot level on the PF reduces to below a lower threshold load. The lower threshold load may be lower than the upper threshold load. The lower threshold load may be calibrated based on exhaust back pressure, and the lower threshold soot load may correspond to a soot level below which filtration capability of the PF may be adversely affected. As described above, during the PF regeneration, the exhaust temperature may be increased by adjustments to engine operating conditions such as by injecting fuel to the exhaust passage upstream of the PF.

If it is confirmed that the PF regeneration is not completed, it may be inferred that the increased exhaust heat may continue to be available for extraction at the exhaust heat exchanger. Therefore, at 318, the current operation of the HVAC system components including the electric heater power setting, the blower speed setting, and the blend door position may be maintained to utilize the available exhaust heat.

If it is determined that PF regeneration is completed and the excess exhaust heat may no longer be available, at 320, the operation of the HVAC system components may be updated to account for the reduced available thermal energy at the heater core while satisfying the current cabin heating/cooling demand. In one example, if there is cabin heating demand, the power supply to the electric heater may be increased to expedite cabin heating while the blower speed may be increased to blow heated air form the heater core to the vehicle cabin and the opening of the blend door may be increased to facilitate flow of thermal energy from the heater core to the vehicle cabin. In another example, if there is a cabin cooling demand, the electric heater may be deactivated, the blower speed may be reduced, and the opening of the blend door may be reduced. The controller may determine the power to be supplied to the electric heater, the speed of operation of the blower, and the opening of the blend door as a function of a difference between the actual vehicle cabin temperature and the desired vehicle cabin temperature.

In this way, a regeneration event of a particulate filter (PF) coupled to an exhaust passage of a vehicle engine system may be scheduled based on a soot load on the PF, an amount of exhaust heat flow from the engine to a tailpipe via a gas to coolant heat exchanger having the coolant flowing therethrough during the scheduled regeneration event may be predicted, and prior to the scheduled regeneration event, an amount of power supplied to an electric heater coupled to an on-board heating, ventilation, and air conditioning (HVAC) system may be reduced based on the predicted amount of exhaust heat flow.

FIG. 4 shows an example timeline 400 illustrating adjustments to a heating, ventilation and air-conditioning (HVAC) system coupled to the vehicle based on a predicted exhaust particulate filter regeneration event. The horizontal (x-axis) denotes time and the vertical markers t0-t4 identify significant times in the operation of the HVAC system.

The first plot, line 402, shows variation in vehicle cabin heating demand over time. The cabin heating demand is based on each of a desired cabin temperature as indicated by an operator of the vehicle via a human machine interface (HMI) coupled to the cabin and an actual cabin temperature as estimated via a temperature sensor coupled to the cabin, the cabin heating demand increasing with an increase in a difference between the desired cabin temperature and the actual cabin temperature. The second plot, line 406, shows a load of particulate matter deposited on a particulate filter (such as PF 171 in FIG. 1) coupled to the exhaust passage of the engine. PF load may be estimated based on input from a differential pressure sensor coupled to the PF. Dashed line 403 shows a first threshold PF load at which regeneration of the PF may be desired. The first threshold PF load may be calibrated based on an exhaust backpressure generated due to accumulation of particulate matter on the PF. Dashed line 404 shows a second threshold PF load at which regeneration of the PF may be predicted. The second threshold PF load may be dynamically calibrated based on a rate of soot production by the engine. Dashed line 405 shows a third threshold PF at which regeneration of the PF may be discontinued. The second threshold PF load may be calibrated based on a mesh density of the PF. The third plot, line 408, shows temperature of exhaust gas flowing through a heat exchanger (such as heat exchanger 176 in FIG. 1) coupled to the exhaust passage downstream of the PF. The fourth plot, line 409, shows injection of fuel to the exhaust passage, upstream of the PF, via a fuel injector (such as injector 67 in FIG. 1). The fifth plot, line 410, shows an amount of power supplied to an electric heater (such as electric heater 97 in FIG. 2) coupled to the HVAC system by a battery. The sixth plot, line 412, shows a speed of operation of a blower coupled to the HVAC system.

Prior to time t1, due to ongoing combustion, the PF loading may continually increase. Since the PF is not regenerated during this time, injection of fuel upstream of the PF is not desired. Temperature of exhaust flowing through the heat exchanger remains substantially constant. Heat from the exhaust flowing through the heat exchanger is recovered via a coolant flowing through the heat exchanger. The coolant with the recovered heat then flows through the heater core, wherein the recovered exhaust heat is used for providing heat to the vehicle cabin. However, the recovered exhaust heat is not sufficient to meet the cabin heating demand. Therefore, the electric heater and the blower are operated to provide heat to the vehicle cabin. The power supplied to the electric heater is directly proportional to the cabin heating demand. The blower is operated to blow hot air to the vehicle cabin, the speed of the blower adjusted based on the cabin heating demand.

At time t1, in response to the PF load increasing to the second threshold load 404, an upcoming regeneration of the PF is scheduled. Based on the PF loading, a time elapsed since an immediately previous regeneration of the PF, and a rate of soot production during combustion, it is inferred that the PF loading will reach the first threshold 403 at time t2 and therefore PF regeneration will be initiated at time t2. It is also predicted that during the upcoming PF regeneration event, there will be an increase in the temperature of exhaust flowing through the heat exchanger. Based on the predicted increase in exhaust heat supply, at time t1, the power supplied to the electric heater is preemptively reduced to initiate the ramp down process of the heater. By initiating the ramp down process ahead of the actual PF regeneration event, sufficient time is provided for the ramp down to take place, and energy usage of the electric heater is reduced. Also, the blower speed in reduced in anticipation of availability of exhaust heat.

Between time t1 and t2, the PF load continues to increase and at time t2, as the PF load increases to the first threshold load 403, active regeneration of the PF is initiated. In order to actively regenerate the PF, at time t2, the controller sends a signal to the injector coupled to the exhaust passage to inject fuel to the exhaust stream upstream of the PF. Between time t2 and t3, fuel is injected to the exhaust passage upstream of the PF in order to increase the temperature of exhaust entering the PF. The thermal energy from the exhaust is utilized in burning the soot deposited on the PF and as the PF is regenerated, the soot loading steadily decreases. As PF regeneration is an exothermic reaction, heat is generated causing the temperature of exhaust flowing through the heat exchanger downstream of the PF to increase. The coolant extracts the exhaust heat at the heat exchanger and transfers the exhaust heat to the heater core coupled to the HVAC system via one or more coolant lines. Between time t2 and t3, since the excess exhaust heat is available, the electric heater is continued to be operated with a lower power supply and the blower may be maintained at the lower speed.

At time t3, in response to the PF load reaching the third threshold load 405, it is inferred that PF regeneration is complete and fuel injection to the exhaust passage upstream of the PF is no longer desired for increasing exhaust temperature. The controller sends a signal to the injector to discontinue fuel injection to the exhaust stream upstream of the PF. As the PF regeneration is complete, there is a decrease in the temperature of exhaust flowing through the heat exchanger. Due to the reduction in available exhaust heat, in order to meet the cabin heating demand, the power supplied to the electric heater is increased and also the speed of the blower is increased.

At time t4, it is observed that the cabin heating demand decreases. In response to the decrease in cabin heating demand, the power supplied to the electric heater is also decreased to reduce energy consumption. Also, the speed of the blower is reduced to decrease parasitic loss of engine power.

In this way, by preemptively adjusting settings of HVAC system components based on a predicted increase in exhaust heat, utilization of the available energy may be improved and fuel efficiency may be increased. The technical effect of predicting a PF regeneration event is that an associated increase in the exhaust heat may be estimated in advance, and the amount of adjustments to be made to the HVAC system components may be optimized. By adjusting the power supplied to the electric heater prior to the actual PF regeneration, there may not be any undesired increase in heat supplied to the vehicle cabin during a spike in exhaust heat.

An example engine method comprises: predicting an amount of exhaust heat recovered from an upcoming regeneration of a particulate filter (PF) coupled to an exhaust passage of an engine propelling a vehicle, and adjusting an amount of electrical power supplied to an electric heater coupled to a cabin heating system for a cabin of the vehicle, the amount of adjustment based on the predicted amount of recovered exhaust heat. In any preceding example, additionally or optionally, the upcoming regeneration of the PF is predicted based on one or more of an estimated soot load on the PF, a time elapsed since an immediately previous regeneration of the PF, and a rate of soot production during combustion, the rate of soot production based on one or more of an engine load, an engine temperature, and an engine speed. In any or all of the preceding examples, the method further comprises, additionally or optionally, during the upcoming regeneration, injecting fuel to one or more engine cylinders during an exhaust stroke to increase temperature of exhaust gas flowing through the PF. In any or all of the preceding examples, the method further comprises, additionally or optionally, during the upcoming regeneration, injecting fuel to the exhaust passage via a fuel injector coupled to the exhaust passage upstream of the PF to increase the temperature of exhaust gas flowing through the PF. In any or all of the preceding examples, additionally or optionally, exhaust heat is recovered via an engine coolant flowing through a heat exchanger coupled to the exhaust passage downstream of the PF, the method further comprising, transferring the exhaust heat via the coolant to a heater core coupled to the cabin heating system. In any or all of the preceding examples, additionally or optionally, the predicted amount of exhaust heat recovered is based on one or more of a temperature of exhaust gas flowing through the heat exchanger, a volume of exhaust gas flowing through the heat exchanger, and a temperature of coolant flowing through the heat exchanger, during the upcoming regeneration. In any or all of the preceding examples, additionally or optionally, the amount of adjustment of electrical power supplied to the electric heater is further based on a cabin heating demand, the amount of adjustment increased with an increase in the predicted amount of recovered exhaust heat and the amount of adjustment decreased with an increase in the cabin heating demand. In any or all of the preceding examples, additionally or optionally, the cabin heating demand is based on each of a desired cabin temperature as indicated by an operator of the vehicle via a human machine interface (HMI) coupled to the cabin and an actual cabin temperature as estimated via a temperature sensor coupled to the cabin, the cabin heating demand increasing with an increase in a difference between the desired cabin temperature and the actual cabin temperature. In any or all of the preceding examples, the method further comprises, additionally or optionally, adjusting a speed of a blower coupled to the cabin heating system based on each of the predicted amount of exhaust heat recovered during the upcoming regeneration and the cabin heating demand, the speed of the blower decreased with one or more of an increase in the predicted amount of exhaust heat recovered and a decrease in the cabin heating demand. In any or all of the preceding examples, the method further comprises, additionally or optionally, adjusting a position of a blend door coupled to the cabin heating system based on each of the predicted amount of exhaust heat recovered during the upcoming regeneration and the cabin heating demand, the opening of the blend door decreased with one or more of an increase in the predicted amount of exhaust heat recovered and a decrease in the cabin heating demand. In any or all of the preceding examples, additionally or optionally, adjusting the amount of electrical power supplied to the electric heater includes reducing the amount of power supplied to the electric heater upon prediction of exhaust heat recovery from the upcoming regeneration of the particulate filter.

Another example engine method comprises: scheduling a regeneration event of a particulate filter (PF) coupled to an exhaust passage of a vehicle engine system based on a soot load on the PF, predicting an amount of exhaust heat flow from the engine to a tailpipe via a gas to coolant heat exchanger having the coolant flowing therethrough during the scheduled regeneration event, and prior to the scheduled regeneration event, reducing an amount of power supplied to an electric heater coupled to an on-board heating, ventilation, and air conditioning (HVAC) system based on the predicted amount of exhaust heat flow. In any preceding example, additionally or optionally, the coolant extracts the exhaust heat at the heat exchanger and transfers the exhaust heat to a heater core coupled to the HVAC system via one or more coolant lines. In any or all of the preceding examples, additionally or optionally, the predicting the amount of exhaust heat flow includes predicting a volume of exhaust flowing through the heat exchanger during the scheduled regeneration event and predicting a temperature of exhaust flowing through the heat exchanger during the scheduled regeneration event, the predicted amount of exhaust heat flow increasing with each of an increase in the predicted volume of exhaust flowing through the heat exchanger and the predicted temperature of exhaust flowing through the heat exchanger. In any or all of the preceding examples, additionally or optionally, the amount of power supplied to the electric heater is inversely proportional to the predicted amount of exhaust heat flow, the amount of power supplied decreased with an increase in the predicted amount of exhaust heat flow. In any or all of the preceding examples, additionally or optionally, scheduling includes determining a time of the regeneration event and immediately prior to the time of the regeneration event, actively increasing a temperature of exhaust gas flowing through the PF. In any or all of the preceding examples, additionally or optionally, the actively increasing the temperature of exhaust gas flowing through the PF includes one or more of injecting fuel to one or more engine cylinders during an exhaust stroke and injecting fuel to the exhaust passage upstream of the PF.

In yet another example, a system comprises: a vehicle, including an autonomous vehicle and/or a hybrid vehicle, an engine including one or more cylinders, one or more fuel injectors coupled to the one or more cylinders, a vehicle cabin including a human machine interface (HMI) and a temperature sensor, an engine intake manifold, an engine exhaust system including an exhaust passage, the exhaust passage including a particulate filter (PF) and an exhaust heat exchanger positioned downstream of the particulate filter, a differential pressure sensor coupled to the exhaust passage across the PF, a coolant system with an incoming coolant line and an outgoing coolant line for circulating coolant through the heat exchanger, the coolant system further coupled to each of an engine block, and a heater core of a heating, ventilation and air conditioning (HVAC) system, the HVAC system including an electric heater operated via a battery, a blend door, and a blower; and a controller with computer readable instructions stored on non-transitory memory to: estimate a load on the PF via the differential pressure sensor, estimate a heating demand of the vehicle cabin based on a temperature setting indicated via the HMI and a cabin temperature estimated via the temperature sensor, in response to a higher than threshold load of the PF, predict a regeneration of the PF, and adjust operation of one or more of the electric heater, the blend door, and the blower based on each of an anticipated amount of heat recovered by the coolant circulating through the heat exchanger during the predicted regeneration of the PF and the heating demand of the vehicle cabin. In any preceding example, additionally or optionally, adjusting operation includes one or more of reducing an amount of power supplied to the electric heater from the battery, reducing an opening of the blend door, and reducing a speed of operation of the blower with an increase in the anticipated amount of heat recovered. In any or all of the preceding examples, additionally or optionally, the anticipated amount of heat recovered is a function of exhaust temperature during the predicted regeneration of the PF and a duration of the predicted regeneration of the PF.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
scheduling a regeneration event of a particulate filter (PF) coupled to an exhaust passage of a vehicle engine system based on a soot load on the PF;
predicting an amount of exhaust heat flow from the engine to a tailpipe via a gas to coolant heat exchanger having coolant flowing therethrough during the scheduled regeneration event;
flowing coolant from the heat exchanger to a heater core coupled to an on-board heating, ventilation, and air conditioning (HVAC) system via one or more coolant lines, where exhaust heat extracted by the coolant flowing through the heat exchanger is transferred to the heater core via the coolant;

determining an amount of power to be supplied to an electric heater coupled to the HVAC system based on the predicted amount of exhaust heat flow and a cabin heating demand; and prior to the scheduled regeneration event, supplying the determined amount of power to the electric heater.

2. The method of claim 1, wherein the HVAC system includes vanes and/or a blend door configured to control air circulation between the heater core and a vehicle cabin based on the cabin heating demand.

3. The method of claim 1, wherein the predicting the amount of exhaust heat flow includes predicting a volume of exhaust flowing through the heat exchanger during the scheduled regeneration event and predicting a temperature of exhaust flowing through the heat exchanger during the scheduled regeneration event, the predicted amount of exhaust heat flow increasing with each of an increase in the predicted volume of exhaust flowing through the heat exchanger and an increase in the predicted temperature of exhaust flowing through the heat exchanger.

4. The method of claim 1, wherein supplying the determined amount of power to the electric heater prior to the scheduled regeneration event comprises reducing the amount of power supplied to the electric heater, where the amount of power supplied to the electric heater is inversely proportional to the predicted amount of exhaust heat flow, the amount of power supplied decreased with an increase in the predicted amount of exhaust heat flow.

5. The method of claim 1, wherein scheduling includes determining a time of the regeneration event and at the time of the regeneration event, actively increasing a temperature of exhaust gas flowing through the PF.

6. The method of claim 5, wherein the actively increasing the temperature of exhaust gas flowing through the PF includes one or more of injecting fuel to one or more engine cylinders during an exhaust stroke and injecting fuel to the exhaust passage upstream of the PF.

7. The method of claim 2, wherein the HVAC system further includes a blower, and wherein a speed of the blower is adjusted based on the predicted amount of exhaust heat flow and the cabin heating demand, the speed of the blower decreased with one or more of an increase in the predicted amount of exhaust heat flow and a decrease in the cabin heating demand.

8. The method of claim 2, further comprising adjusting a position of the blend door based on the predicted amount of exhaust heat flow and the cabin heating demand, an opening of the blend door decreased with one or more of an increase in the predicted amount of exhaust heat flow and a decrease in the cabin heating demand.

9. The method of claim 1, wherein the vehicle engine system is part of a vehicle including a cabin, wherein the cabin heating demand is based on each of a desired cabin temperature as indicated by an operator of the vehicle via a human machine interface (HMI) coupled to the cabin and an actual cabin temperature as estimated via a temperature sensor coupled to the cabin, the cabin heating demand increasing with an increase in a difference between the desired cabin temperature and the actual cabin temperature.

* * * * *